(12) United States Patent
Kim et al.

(10) Patent No.: US 9,171,223 B2
(45) Date of Patent: Oct. 27, 2015

(54) SYSTEM AND METHOD FOR EFFECTIVE SECTION DETECTING OF HAND GESTURE

(71) Applicant: Hyundai Motor Company, Seoul (KR)

(72) Inventors: Sung Un Kim, Gyeonggi-do (KR); Sihyun Joo, Seoul (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 14/102,038

(22) Filed: Dec. 10, 2013

(65) Prior Publication Data

US 2014/0169626 A1 Jun. 19, 2014

(30) Foreign Application Priority Data

Dec. 18, 2012 (KR) ........................ 10-2012-0148597

(51) Int. Cl.
*G06K 9/00* (2006.01)
*G06K 9/34* (2006.01)
*H04N 5/225* (2006.01)
(52) U.S. Cl.
CPC .............. *G06K 9/34* (2013.01); *G06K 9/00335* (2013.01)
(58) Field of Classification Search
CPC ....................................................... G06K 9/00
USPC ........... 382/103, 107, 236; 348/169–172, 352
See application file for complete search history.

(56) References Cited

U.S. PATENT DOCUMENTS

| 6,624,833 B1 * | 9/2003 | Kumar et al. ................. 715/863 |
| 8,112,719 B2 * | 2/2012 | Hsu et al. ...................... 715/810 |
| 8,582,037 B2 * | 11/2013 | Stern et al. .................... 348/734 |

FOREIGN PATENT DOCUMENTS

| JP | 2011-253493 A | 12/2011 |
| JP | 2012-146220 A | 8/2012 |
| KR | 10-2008-0029730 A | 4/2008 |

OTHER PUBLICATIONS

Yoon, Ho-Sub et al., "A Comparison of Gesture Recognition Performance Based on Feature Spaces of Angle, Velocity and Location in HMM Model", Jun. 2003, 420-443.

\* cited by examiner

*Primary Examiner* — Abolfazl Tabatabai
(74) *Attorney, Agent, or Firm* — Mintz Levin Cohn Ferris Glovsky and Popeo, P.C.; Peter F. Corless

(57) ABSTRACT

A system is provided for detecting an effective section of a gesture by recognizing the gesture, pose information and motion information included in the gesture from an acquired image. In addition, a controller determines whether a pose has been recognized based on the pose information and when the pose has been recognized, an effective section is detected based on a start point and an end point of the pose. Further, when the effective section for the pose is detected, the gesture is recognized based on the motion information.

13 Claims, 4 Drawing Sheets

(a)          (b)          (c)

FIG. 1
RELATED ART
(a)
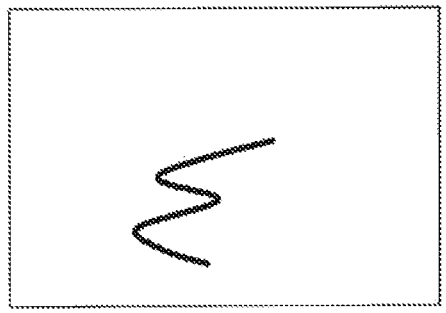
(b)
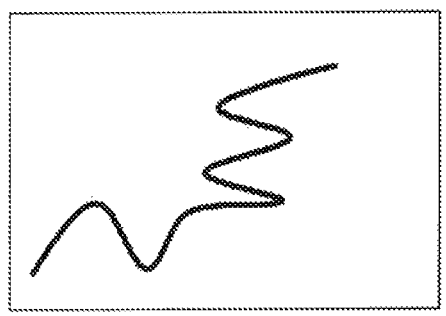
(c)

SYSTEM AND METHOD FOR EFFECTIVE SECTION DETECTING OF HAND GESTURE

CROSS-REFERENCE TO RELATED APPLICATION

This application claims priority to and the benefit of Korean Patent Application No. 10-2012-0148597 filed in the Korean Intellectual Property Office on Dec. 18, 2012, the entire contents of which are incorporated herein by reference.

BACKGROUND (a) Field of the Invention

The present invention relates to a system and a method for detecting an effective section of a hand gesture.

(b) Description of the Related Art

A user's intention of a gesture is important in a system that recognizes a gesture, based on images collected by an imaging device (e.g., a camera) due to difficulty in accurately determining gestures when the system recognizes actions other than predetermined gestures.

Further, for a system using a method of recognizing gestures by signal processing in common systems for detecting and recognizing gestures, the system recognize a gesture from when there is displacement of a predetermined motion, thus, decreasing the speed at which the gesture is recognized. In addition, the rate of recognizing a gesture decreases, when the size of a motion trajectory is different from the size of a predetermined trajectory. A gesture is recognized using a learning algorithm and the trajectory of the gesture may not fit to a predetermined trajectory, to classify an incorrect recognition. Accordingly, a user may have to stop the motion at the beginning and the end of a gesture to allow the system to recognize the type of gesture being performed by the user. The above information disclosed in this section is only for enhancement of understanding of the background of the invention and therefore it may contain information that does not form the prior art that is already known in this country to a person of ordinary skill in the art.

SUMMARY

The present invention provides a system and a method for detecting an effective section of a hand gesture having advantages of improving the accuracy of detecting an intention of a hand gesture. An exemplary embodiment of the present invention provides a method for detecting an effective section (e.g., a section from a start point to an end point of a recognizable gesture) of a hand gesture using a system that detects an effective section of a hand gesture to recognize a gesture.

The method may include acquiring an image that includes a gesture and a background; extracting pose information and motion information included in the gesture, as features, from the gesture in the image; determining whether a pose has been recognized based on the pose information; detecting an effective section of the pose based on a start point (e.g., the motion of the pose when the gesture is first performed) and an end point of the pose (e.g., the motion of the pose when the gesture is completed), when the pose has been recognized; and recognizing the gesture based on the motion information, when an effective section for the pose has been detected.

The determining of whether the pose has been recognized may include: determining which of one or more items of feature information, stored in advance, the extracted pose information corresponds to; and recognizing the extracted pose information as a pose, when the extracted pose information corresponds to any one of the feature information.

The detecting of an effective section may include: determining the start point of the pose; determining the end point of the pose; determining whether the section from the start point to the end point continues for a predetermined time or more; and determining the section between the start point to the end point as an effective section, when the section continues for the predetermined time or more.

The recognizing of a gesture may include: determining which of one or more items of feature information, stored in advance, the extracted motion information corresponds to; and outputting the extracted motion information as a gesture recognition result, when the extracted motion information corresponds to any one of the feature information.

The extracting of pose information and motion information as features may include extracting the pose as pose information using a template matching algorithm or extracting and then modeling the features of a pose image, and the motion as motion information by recognizing the motion, using any one of signal processing or learning algorithm.

Another exemplary embodiment of the present invention provides a system that detects an effective section of a hand gesture.

The system includes and plurality of units executed by a controller that has a processor and a storage unit. The plurality of units may include an image acquiring unit that acquires an image including a background and a gesture having pose information and motion information; a feature detecting unit that detects the pose information and the motion information from the gesture and extracts the pose information by determining whether there is information that corresponds to the motion information in previously feature information stored; a gesture start point determining unit that detects the start point of the pose information, when the feature detecting unit detects the pose information; a gesture end point determining unit that detects the end point of the pose information, when the feature detecting unit detects the pose information; and a gesture recognizing unit that detects an effective section for the pose based on the start point detected by the gesture start point determining unit and the end point detected by the gesture end point determining unit, and recognizes a gesture by determining the motion information extracted by the feature detecting unit is included in the previously feature information stored, when the effective section is detected.

The plurality of units may further include: a background removing unit that removes the background from the image acquired by the image acquiring unit and provides only the gesture to the feature detecting unit; and a feature information storing unit that stores and provides feature information used by the feature detecting unit and the gesture recognizing unit to determine the pose information and the motion information.

According to the present invention, since it may be possible to improve accuracy in detecting the start and the end of a gesture, it may be possible to remove an incorrect recognition of a non-intended gesture by the system. Further, since a natural gesture may be set, the gesture recognition system may be intuitively used.

BRIEF DESCRIPTION OF THE DRAWINGS

FIG. 1 is an exemplary diagram for recognizing a common hand gesture according to the related art;

DETAILED DESCRIPTION

Figure 2:
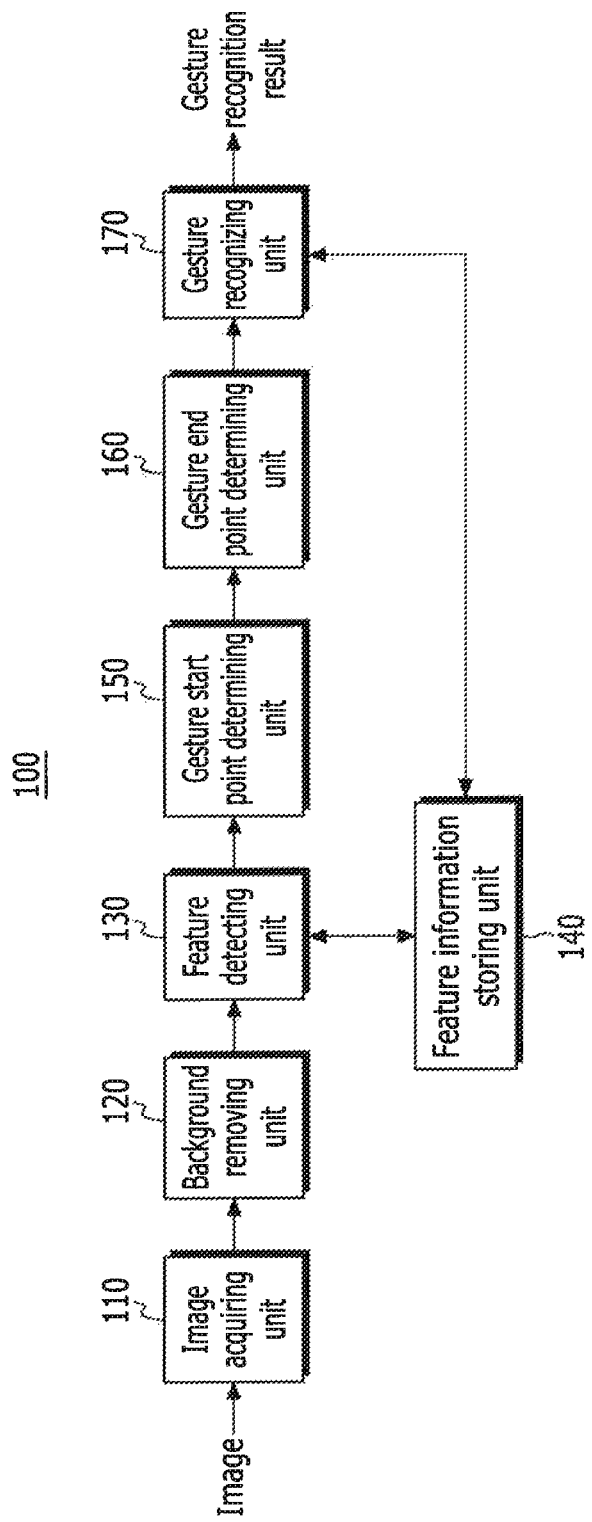
FIG. 2 is an exemplary diagram illustrating the structure of a system that detects an effective section of a gesture according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, As used herein, the term "and/or" includes any and all combinations of one or more of the associated listed items.

In the following detailed description, only exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Throughout the specification, unless explicitly described to the contrary, the word "comprise" and variations such as "comprises" or "comprising," will be understood to imply the inclusion of stated elements but not the exclusion of any other elements.

Hereinafter, a system and a method for detecting an effective section (e.g., a section from a start point to an end point of a recognizable gesture) of a hand gesture according to an exemplary embodiment of the present invention will be described with reference to the accompanying drawings. FIG. 1 is an exemplary diagram for recognizing a common hand gesture.

As shown in (a) of FIG. 1, according to a common technology of recognizing a gesture, a system recognizes a motion trajectory of a hand feature by signal processing or using a learning algorithm. However, common systems for detecting and recognizing a gesture are n provided with a module that detects the accurate point of e where a user inputs a gesture.

Specifically, when a gesture is recognized by signal processing, the gesture may begin to be recognized from when there is displacement in a predetermined motion, thus decreasing the speed at which a gesture may be recognized. Further, the rate of recognizing a gesture decreases, when the size of a motion trajectory is different from the size of a predetermined trajectory.

When recognition is performed using a learning algorithm and a predetermined trajectory shown in (b) of FIG. 1 does not fit to the trajectory of an actual gesture of a user shown in (c) of FIG. 1, the system may be configured to determine an incorrect recognition of the user's gesture. Accordingly, a user has to stop the motion at the start and the end of the gesture. In other words, since the start and the end of a gesture motion are not accurately recognized, uncertainty of the system recognizing the motion increases. Further, when the user unintentionally makes an action similar to a predetermined gesture, the system may recognize the action as a gesture, causing frequent incorrect recognition. Therefore, according to an exemplary embodiment of the present invention, it may be possible to reduce incorrect recognition of a gesture, due to increased accuracy in detecting the start and the end of a gesture An exemplary embodiment of the present invention uses a system that detects an effective section of a gesture, as shown in FIG. 2, to accurately determine the start and the end of a gesture. In an exemplary embodiment of the present invention, an effective section may be determined by combining pose recognition with motion recognition to accurately determine the start and the end of a gesture. FIG. 2 is an exemplary diagram illustrating the structure of a system that detects an effective section according to an exemplary embodiment of the present invention.

As shown in FIG. 2, a system 100 that detects an effective section may include a plurality of units executed by a controller. The plurality of units may include an image acquiring unit 110, a background removing unit 120, a feature detecting unit 130, a feature information storing unit 140, a gesture start point determining unit 150, a gesture end point determining unit 160, and a gesture recognizing unit 170.

The image acquiring unit 110 may be configured to acquire images input via a device capable of acquiring images, such as a camera (not shown). The images may include not only a user's gesture, but also the background image of the user's gesture. The background removing unit 120 may be configured to acquire the user's gesture by removing the background from the image acquired by the image acquiring unit 110. There are many methods of removing the background from an image and an exemplary embodiment of the present invention does not specify any one method.

The feature detecting unit 130 may be configured to detect a feature for the user's gesture from the user's gesture acquired by the background removing unit 120 and feature information stored in the feature information storing unit 140. The feature detecting unit 130 may be configured to recognize the pose of a hand from the user's gesture. Specifically, the pose may be recognized by comparing the entire image such as a template matching algorithm or by extracting or modeling a feature on a pose image, such that any one of them is not specified in the description.

The feature detecting unit 130 may be configured to recognize the motion of the hand, in response to recognizing the hand pose. The motion of the hand may be recognized by signal processing or a learning algorithm and the method of recognizing the motion of the hand is well known in the art; therefore, it is not described in detail herein. However, when failing to recognize the hand pose, the feature detecting unit 130 may be configured to detect the feature until the hand pose is recognized. The feature may be the pose and motion of the user's hand, in which the pose may he the shape of the hand and the motion may be the movement direction or movement type of the hand.

The feature information storing unit 140 may be configured to store a plurality of predetermined items of feature information and provide the feature information to the feature detecting unit 130 and the gesture recognizing unit 170. The feature information may include pose information and motion information. The pose information may include information regarding the poses such as a fist with only the thump or the forefinger stretched out, or the palm open upside, or the fingers pursed. The motion information may include information on various motions such as moving a hand up and down or left and right, rotating a hand, and waving a hand.

When the feature detecting unit 130 detects features of the user's hand, the gesture start point determining unit 150 may be configured to determine the start point of the gesture from the motion of the detected features. When the feature detecting unit 130 detects features of the user's hand, the gesture end point determining unit 160 may be configured to determine the end point of the gesture from the motion of the detected features.

The gesture recognizing unit 170 may be configured to receive the information on the start point of the gesture determined by the gesture start point determining unit 150 and the end point of the gesture determined by the gesture end point determining unit 160 and determine whether it is possible to determine the section from the start point to the end point of the gesture as an effective section of the gesture. The gesture recognizing unit 170 may be configured to determine the effective section of the gesture, when the gesture continues for a predetermined time.

When the effective section is determined, the user's gesture may be recognized from the pose of the hand determined by the feature detecting unit 130. Further, the e controller may be configured to determine whether a motion substantially the same as the motion detected by the gesture recognizing unit 170 is in the motion information stored in the feature information storing unit 140. When the same information is stored in the feature information storing unit 140, the gesture recognizing unit 170 may be configured to output the gesture recognition result to allow a predetermined control to be performed on the recognized gesture. However, when there the substantially same motion information is not detected, the feature detecting unit 130 may be operated by the controller to detect a feature from the gesture.

Figure 3:
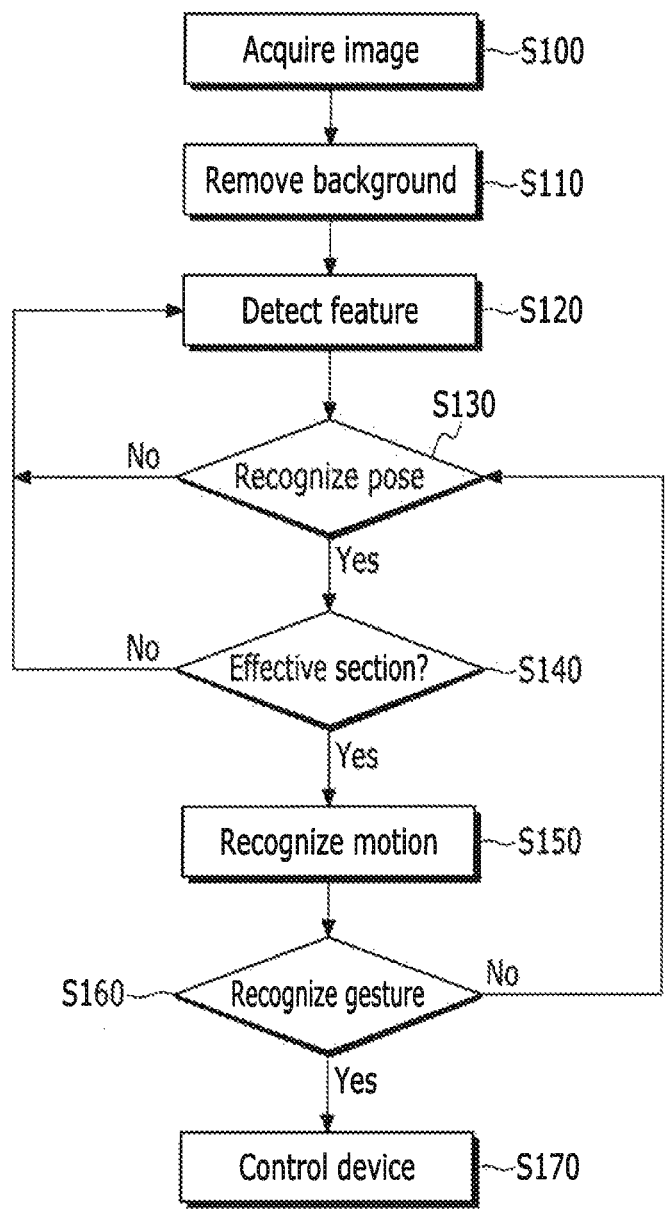
FIG. 3 is an exemplary flowchart illustrating a method of detecting an effective section according to an exemplary embodiment of the present invention.

A method of detecting an effective section of a gesture using the system 100 that detects an effective section is described hereafter with reference to FIG. 3. FIG. 3 is an exemplary flowchart illustrating a method of detecting an effective section according to an exemplary embodiment of the present invention.

As shown in FIG. 3, when the image acquiring unit 110 acquires an image that includes a user's gesture and the background of the gesture (S100), the background removing unit 120 may be configured to remove the background from the image (S110). The method of operating the background removing unit 120 by the controller to remove the background from an image with a gesture left is known in the art, such that the detailed description is not provided herein. When the background removing unit 120 removes the background, the feature detecting unit 130 may be configured to detect features from the gesture. The features may include the pose and motion of a hand of the user making the gesture.

First, the feature detecting unit 130 may be configured to determine whether the information that corresponds to the information regarding the pose of the detected features corresponds to any one item of information from a plurality of items of information stored in the feature information storing unit 140, that is, whether the pose has been recognized (S130). When the pose of the user's hand does not correspond to any one of the items of feature information stored in the feature information storing unit 140, the feature detecting unit 130 may be configured to detect features from the next image.

In contrast, when the pose of the user's hand corresponds to any one of the items of feature information stored in the feature information storing unit 140, the gesture start point determining unit 150 may be configured to detect the start point of the motion of the hand and the gesture end point determining unit 160 may be configured to detect the end point of the motion, and then the information on the start point and end point may be transmitted to the gesture recognizing unit 170. The gesture recognizing unit 170 may be configured to determine whether it is possible to determine the corresponding section as an effective section for gesture recognition, based on the e information on the start point and end point of the gesture (S140).

When the gesture recognizing unit 170 does not determine the section as an effective section due to discontinuing of the section before a predetermined time, the detecting of features in S120 may be repeated. However, when the pose continues over the predetermined time and the gesture recognizing unit 170 may be configured to determine the section as an effective section and the motion of the hand of the gesture detected by the feature detecting unit 130 may be recognized (S150). The feature detecting unit 130 may recognize the motion of a hand using various methods, such as by signal processing or using a learning algorithm, such that any one of the methods is not specified in the description of an exemplary embodiment of the present invention.

The gesture recognizing unit 170 may be configured to determine whether one or more of the hand motions recognized in S150 is included in the feature information storing unit 140 is recognized as a gesture (S160). When the same information as the information on the motion of the user is not stored in the feature information storing unit 140, the recognizing of a pose in S130 may be repeated. When the same information as the information on the motion of the user is stored in the feature information storing unit 140, the gesture recognizing unit 170 may be configured to output the gesture recognition result and request device control according to the gesture recognition result (S170).

Figure 4:
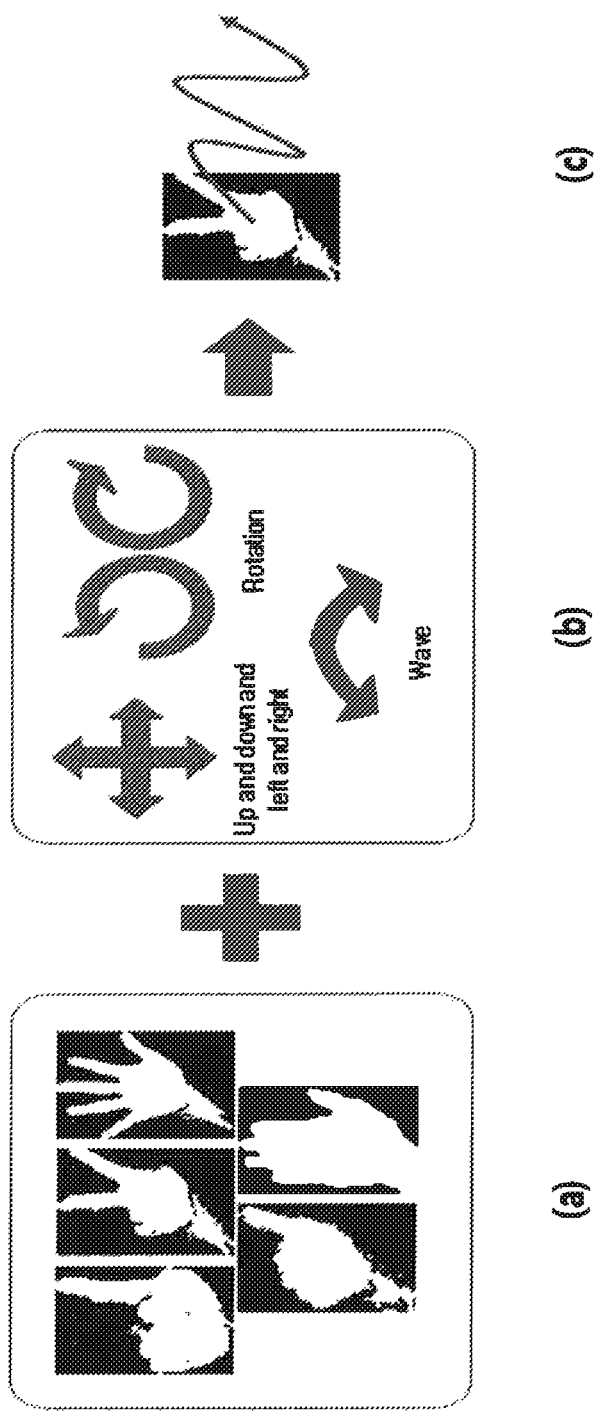
FIG. 4 is an exemplary diagram illustrating a combination of pose recognition and gesture motion recognition according to an exemplary embodiment of the present invention.

An exemplary embodiment of the method described above is described with reference to FIG. 4. As an example, an audio system of a vehicle may be operated based on a pose and a gesture. FIG. 4 is an exemplary diagram illustrating a combination of pose recognition and gesture motion recognition according to an exemplary embodiment of the present invention.

In an exemplary embodiment of the present invention five exemplary items of information are stored as pose information and three exemplary items of information are stored as motion information in the feature information storing unit 140, as shown in FIG. 4. In addition, the pose information, an audition system of a vehicle may be activated, when two fingers are stretched out in a V-shape, and the channel button of the audio system may be operated when a wave motion is performed with the palm open.

Therefore, as shown in FIG. 4, when a user performs a wave motion with fingers stretched out in a V-shape, the image acquiring unit 110 may be configured to acquire an image that includes the gesture and the background. Then, the background removing unit 120 may be configured to remove the background from the acquired image. Since it is described in the exemplary embodiment of the present invention that an audio system of a vehicle may be activated, as an example, he background in the image may be the seats within the vehicle or other environments within the vehicle.

When the background removing unit 120 acquires only the gesture after removing the background, the feature detecting unit 130 may be configured to detect the pose and the motion of the user's hand which may be the features of the gesture. The feature detecting unit 130 may be configured to determine whether information on the same pose as the detected pose is stored in the feature information storing unit 140, as shown in FIG. 4.

When feature information on the same pose is stored in the feature information storing unit 140, the gesture start point determining unit 150 may be configured to detect the start point of the pose of the hand and the gesture end point determining unit 160 may be configured to detect the end point of the pose of the hand. After the gesture start point determining unit 150 and the gesture end point determining unit 160 detect the start time point and the end time point of the pose of the hand, the gesture recognizing unit 170 may be configured to determine whether it is possible to determine the corresponding section as an effective section of the gesture. The effective section may be determined as an effective section, when the substantially same hand pose continues for a predetermined time.

When the effective section is determined, the gesture recognizing unit 170 may be configured to recognize the motion of the user. The motion may be recognized using various methods such as by signal processing or a learning algorithm. When the gesture recognizing unit 170 determines that the motion of the user is a wave, the gesture recognition result may be transmitted to a controller of the audio system to operate the channel button of the audio system in a predetermined way and the audio system may be operated.

As described above, it may be possible in an exemplary embodiment of the present invention to reduce incorrect recognition of a gesture by finding an effective section of the gesture in gesture recognition.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A method for detecting an effective section of a gesture, the method comprising:
   acquiring, by a controller, an image that includes the gesture and a background;
   extracting, by the controller, pose information and motion information included in the gesture as features;
   determining, by the controller, whether a pose has been recognized based on the pose information;
   in response to determining that a pose has been recgonized, detecting, by the controller, the effective section of the gesture based on a start point and an end point of the pose; and
   in response to detecting the effective section of the guesture, recognizing, by the controller, the gesture based on the motion information,
   wherein the detecting of the effective section of the gesture includes:
      detecting, by the controller, the start point of the pose;
      detecting, by the controller, the end point of the pose;
      determining, by the controller, whether the section from the start point to the end point continues for a predetermined time or more; and
      in respond to determining that the section continues for the predetermined time or more, determining, by the controller, the section between the start point to the end point as the effective section.

2. The method of claim 1, wherein the pose information includes information regarding the pose of a fist with a thumb or a forefinger stretched out, a palm open upside, or clenched fingers.

3. The method of claim 1, wherein the motion information includes information regarding various motions including moving a hand horizontally or vertically, rotating the hand, and waving the hand.

4. The method of claim 1, wherein the determining of whether the pose has been recognized includes:
   determining, by the controller, stored feature information that corresponds to the extracted pose information; and
   in response to determining corresponding stored feature infromation, recognizing, by the controller, the extracted pose information as a pose.

5. The method of claim 1, wherein the recognizing of the gesture includes:
   determining, by the controller, stored feature information that corresponds to the extracted motion information; and
   in response to determining corresponding stored feature information, outputting, by the controller, the extracted motion information as a gesture recognition result.

6. The method of claim 1, wherein the extracting of pose information and motion information as features includes:
   extracting, by the controller, the pose as pose information using a template matching algorithm or extracting and then modeling the features of a pose image, and
   extracting, by the controller, the motion as motion information by recognizing the motion using signal processing or learning algorithm.

7. The method of claim 1, wherein the acquiring of the image includes:
   removing, by the controller, the background from the acquired image.

8. A system that detects an effective section of a hand gesture, the system comprising:
a controller configured to:
acquire an image having a background and the gesture that includes pose information and motion information;
detect the pose information and the motion information from the gesture;
extract the pose information by determining whether information corresponding to the motion information is in stored feature information;
detect a start point of the pose information, in response to detecting the pose information;
detect an end point of the pose information, in response to detecting the pose information; and
detect the effective section for the pose based on the start point and the end point; and
recognize a gesture by determining whether the extracted motion information is included in the stored feature information, in response to detecting the effective section,
wherein for the detection of the effective section of the gesture, the controller is further configures to:
detect the start point of the pose;
detect the end point of the pose;
determine whether the section from the start point to the end point continues for a predetermined time or more; and
in response to determining that the section continues for the predetermined time or more, determine the section between the start point to the end point as the effective section.

9. The system of claim 8, wherein the controller is further configured to:
remove the background from the acquired image; and
store and provide feature information used to detect the pose information and the motion information.

10. The system of claim 8, wherein the pose information includes information regarding the pose of a fist with a thumb or a forefinger stretched out, a palm open upside, or clenched fingers.

11. The system of claim 8, wherein the motion information includes information regarding various motions including moving a hand horizontally or vertically, rotating the hand, and waving the hand.

12. A non-transitory computer readable medium containing program instructions executed by a processor or controller, the computer readable medium comprising:
program instructions that acquire an image having a background and the gesture that includes pose information and motion information;
program instructions that detect the pose information and the motion information from the gesture;
program instructions that extract the pose information by determining whether information corresponding to the motion information is in stored feature information;
program instructions that detect a start point of the pose information, in response to detecting the pose information;
program instructions that detect an end point of the pose information, in response to detecting the pose information; and
program instructions that detect the effective section for the pose based on the start point and the end point; and
program instructions that recognize a gesture by determining whether the extracted motion information is included in the stored feature information, in response to detecting the effective section,
wherein the detection of the effective section of the gesture further includes:
program instructions that detect the start point of the pose;
program instructions that detect the end point of the pose;
program instructions that determine whether the section from the start point to the end point continues for the a predetermined time or more; and
program instructions that determine the section between the start point to the end point as the effective section in response to determine that the section continues for the predetermined time or more.

13. The non-transitory computer readable medium of claim 12, further comprising:
program instructions that remove the background from the acquired image; and
program instructions that store and provide feature information used to detect the pose information and the motion information.

* * * * *